Dec. 30, 1958 H. G. BUSIGNIES ET AL 2,866,900
NONDISPERSIVE INFRARED ANALYZER
Filed Dec. 19, 1955 3 Sheets-Sheet 1
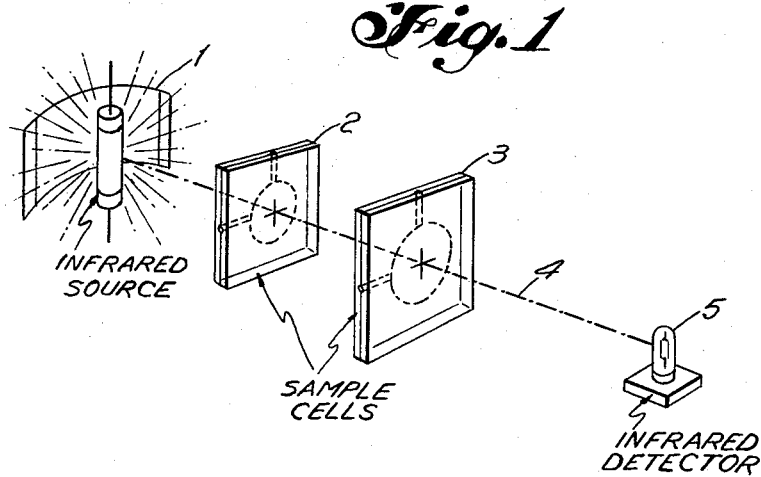
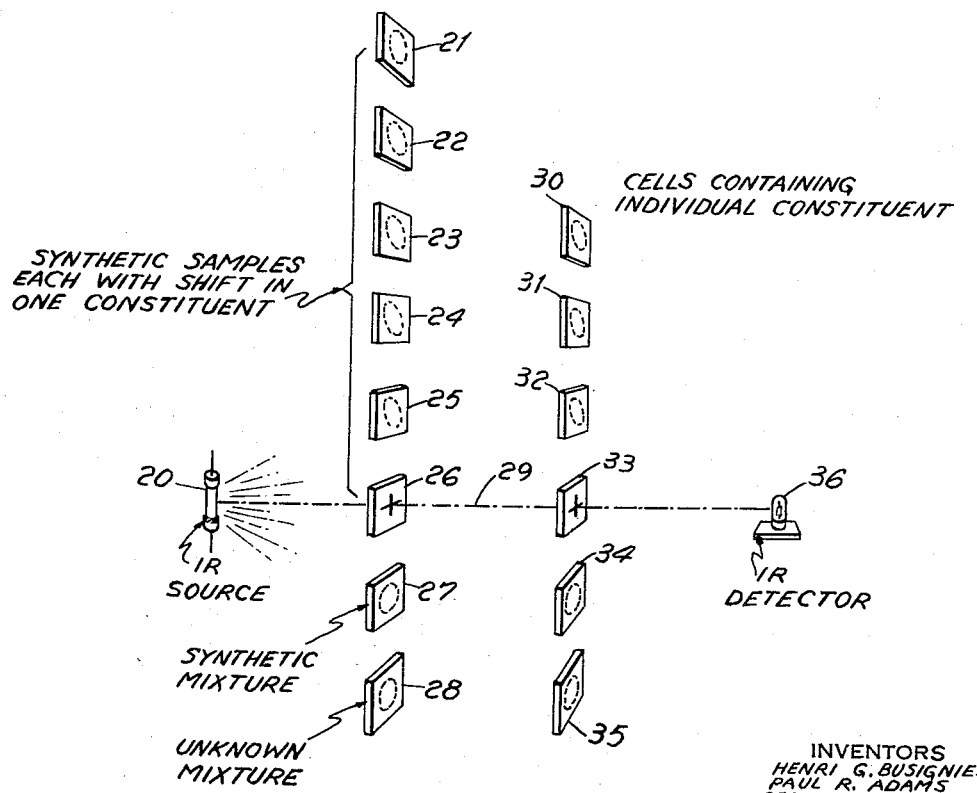
INVENTORS
HENRI G. BUSIGNIES
PAUL R. ADAMS
GEORGES A. DESCHAMPS
BY MORTIMER ROGOFF
Ernest Fanwick
ATTORNEY

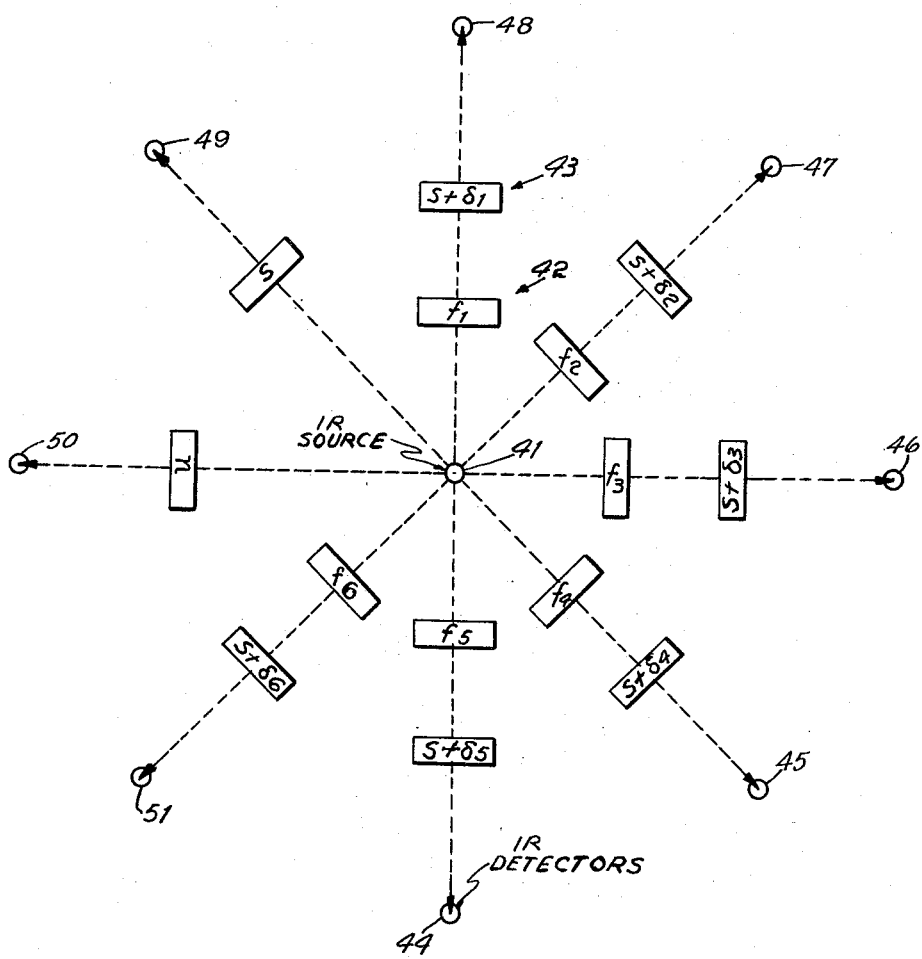

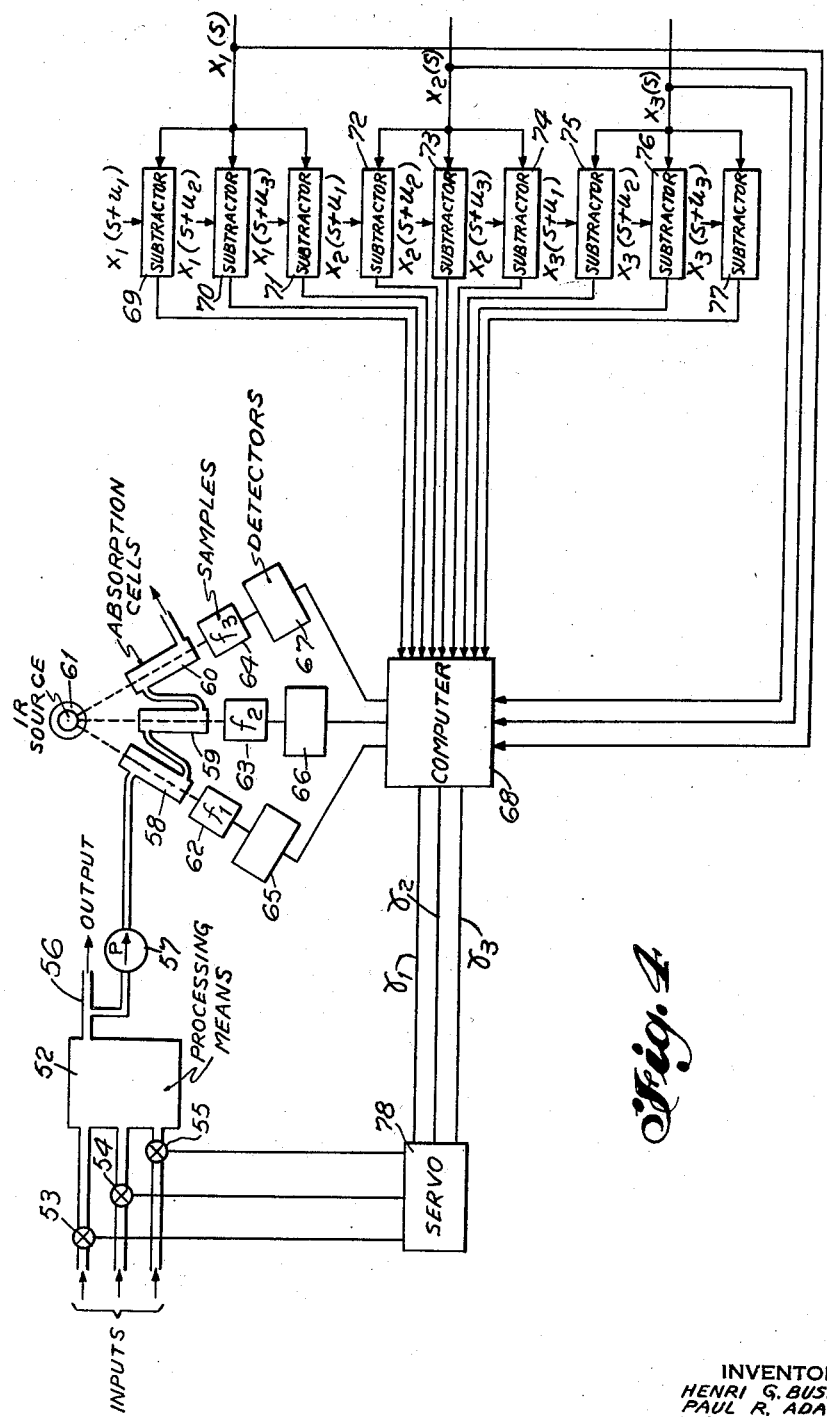

United States Patent Office 2,866,900
Patented Dec. 30, 1958

2,866,900

NONDISPERSIVE INFRARED ANALYZER

Henri G. Busignies, Montclair, and Paul R. Adams, Mountain Lakes, N. J., Georges A. Deschamps, New York, N. Y., and Mortimer Rogoff, Nutley, N. J., assignors to International Telephone and Telegraph Corporation, Nutley, N. J., a corporation of Maryland Application December 19, 1955, Serial No. 553,866

8 Claims. (Cl. 250—43.5)

This invention relates to spectrum analyzing apparatus and, more particularly, to nondispersive infrared spectroanalysis equipment.

In recent years, the absorption by compounds of infrared radiation at various points in the spectrum has been used for analytical purposes. In spite of the valuable information which can be obtained by the measurement of the infrared absorption by a sample, the use of this analytical tool has been greatly restricted due to certain practical difficulties. One difficulty is that the practical sources of infrared do not radiate uniformly throughout the infrared spectrum used in analysis which includes wavelengths substantially between 1 and 30 microns. This nonuniform radiation over the spectrum of interest precludes many types of direct measurements and, in the past, has required comparison of the resulting spectrogram with the emission spectrum of the infrared source before accurate results could be obtained; and this comparison was time consuming and a tedious operation which could normally be performed only in the confines of a well-equipped laboratory. The problem of determining the emission characteristics of the source is further complicated by the extreme difficulty in keeping the emission band of the infrared radiator constant over a period of time. The spectrogram, which is a graph of the percent of infrared radiation transmitted by the sample plotted against the wave length of the radiation, normally shows several bands of relatively high infrared absorption which are characteristic of the atomic masses, the atomic bonds and the molecular configuration in space of the sample being analyzed. While no two compounds have identical spectrograms, it is probable that the spectrograms of many related compounds have similarities including one or more similar absorption bands which coincide or partially overlap. Furthermore, the mean breadth of each absorption band, or in other words the frequency spread of the spectrogram peak, increases as the quantity of the sample in the path of the radiation is increased thus increasing the amount of overlap between absorption bands.

In the past, it has been considered necessary to use very narrow bands of infrared radiation to prevent the absorption in one part of the spectrum from masking the effect in other parts of the spectrum. It will be recognized that infrared monochromators are usually bulky and expensive. Filters in the infrared region are difficult to construct and geneally not satisfactory. Therefore, the use of narrow bands of infrared radiation have seriously interfered in the design of practical apparatus which can be readily used in industry.

It has long been recognized that the magnitude of the absorption at each band varies with the quantity of the compound in the path of the radiation in a manner which can be expressed mathematically by Beer's law. In the simplest case, an infrared analyzer includes a source of infrared radiation, means to confine the radiation to a predetermined narrow band of wavelengths, an absorption chamber containing the sample and a detector to measure the magnitude of the radiation passing through the absorption chamber. Since the accuracy of such a single-path analyzer is dependent upon the constancy of the radiation source, the ambient temperatures and the voltages used in the detector, this analyzer has found little practical utility. A more accurate and stable analyzer is used which divides the radiation from the infrared source into two paths, one passing through the sample chamber onto one detector and the other passing through a second similar chamber, to compensate for the system absorption, onto a second detector, and the difference between the magnitudes of the radiation detected on each of the two detectors being measured.

As both of the prior art analyzers yield a measurement for any material exhibiting infrared absorption, they are of little use where there are a plurality of infrared absorbing materials present. It was, of course, possible to make the infrared analyzer selective by employing infrared sources giving radiation at selected wavelengths or using optical filters to transmit only the desired wavelengths; but such apparatus is expensive, bulky, fragile and too complex for normal industrial uses. Since it is often the case that the samples to be analyzed contain a plurality of constituents having overlapping absorption bands, another difficulty presents itself to the analyst. This difficulty is the realization that the spectrograms of the individual constituents do not always add up in a truly linear manner; and thus, the analyst must utilize some special technique in order to determine the contents of the sample when the nonlinear behavior becomes troublesome. One technique heretofore utilized has been to eliminate from consideration that portion of the spectrogram of the sample being analyzed which is known to contain severe nonlinear behavior. Obviously, this entails some loss of information which normally is not serious since the entire spectrum is used for the analysis and an elimination of a fraction of the spectrum still leaves sufficient data for accurate analysis. An alternate method is the dilution of the mixture resulting in a reduction of the nonlinear effects but this method limits the accuracy since the dilution reduces the magnitude of the absorption spectrogram to the point where the instrumental noise and inherent inaccuracies of the spectrophotometer become appreciable. There are many cases where these simple methods are not effective; and thus, a different analytical process which is capable of dealing with the presence of nonlinear effects is required.

In copending application Serial No. 552,518, filed December 12, 1955, entitled "Electronic Spectroanalysis Computer," by H. G. Busignies-M. Rogoff-G. A. Deschamps, assigned to the same assignee, International Telephone and Telegraph Corporation, as this present application, a computer apparatus is disclosed which performs an analysis of an unknown mixture in terms of the linear combination of its constituent spectra. The present invention is concerned with utilizing the quantitative information obtained from such a computer although the information can be obtained by other methods which describes an unknown mixture in terms of the linear combination of its constituent spectra. Having such information, the present invention takes into consideration the nonliear effects to arrive at a more accurate solution as to the actual quantities of the constituents in the unknown.

Most infrared absorption spectrum analysis is done by manipulating spectra which define percent transmission or absorbance as a function of wavelength or wave number. Such functions are obtained by examining the infrared energy transmitted by a chemical sample with the use of a monochromator. Because of the low level of energy available at the exit slit of a monochromator, the detector must necessarily scan the wavelength interval in a relatively slow fashion. This is done in order to obtain usable signal-to-noise ratios in the spectrogram. A typical spectrum run will take ten minutes or more to cover the wavelength interval from 2 to 15 microns. In this type of scanning process, the only way to obtain improvements in signal-to-noise ratios is to increase the time duration of the scanning. By so doing, the detector is allowed to dwell at each wavelength for a longer period of time, thereby increasing the accuracy of result at each point in the spectrogram. This improvement is obtained slowly, with an improvement factor proportional to the square root of the increased time factor.

Signal-to-noise ratio is an important factor in overall accuracy when either trace chemicals are sought or if weak absorbers are being analyzed. Furthermore, the time required to produce a complete spectrogram, which is of the order of minutes, becomes excessive when the spectrophotometer is to be inserted as a component in a continuous-process control system. Finally, if infrared analysis is to be used in mass testing procedures, the minutes of time required to produce a single spectrogram which may be usable to the research chemist becomes an insurmountable barrier when hundreds or thousands of routine tests are to be made within a period of a day.

One of the properties of conventional spectroanalysis is the lack of discrimination against nonlinear behavior of chemicals in mixtures. The spectrogram of a mixture chemical contains the obscuring effects of nonlinear behavior of its constituents. It cannot be otherwise for the spectrogram merely relates in its own terms the occurrences of combination effects when various constituents are mixed together. If such a spectrogram is used as the basis for analysis, then it is clear that no linear combination of reference spectra can successfully match the spectrogram of the mixture. If extremely accurate analyses are to be established, some steps must be taken to include the effects of this nonlinear behavior within the data used for calculation.

One of the objects of this invention, therefore, is to provide a chemical analysis of an unknown mixture including a consideration of the nonlinear behavior of its constituents by a nondispersive infrared analyzing technique.

Another object of this invention is to consider and provide for the effects of the nonlinear combination of chemicals in a spectroanalysis system by performing a chemical synthesis of the unknown after the linear analysis results are obtained.

A further object of this invention is to provide infrared spectrographic analysis equipment to yield extremely accurate results through a nondispersive technique.

One of the features of this invention is a nondispersive technique of infrared spectroanalysis accomplished by the manipulation of spectra to define a composition's percent transmission or absorbance of infrared radiation as a function of wavelength or wave number. The unknown sample is successively masked by each of a number of constituents, which according to a previous determination make up the unknown, to obtain from the output of the detector a set of integrated absorption coefficients. The same measurements are made substituting the synthetic-mixture specimen, which was previously determined, for the unknown sample. Last, a third or more, depending on the number of constituents in the unknown, set of measurements is made to obtain a set of integrated absorption coefficients using augmented synthetic-sample cells in the unknown sample's place. The augmenting amounts to shifting by a small amount the concentration of each of the constituents of the synthesized mixture. The sets of coefficients are inserted in a system of simultaneous equations where solution for the unknowns yields a set of correction terms which in turn, when applied to the concentration coefficients of the original quantitative analysis, produces an accurate statement of the composition of the mixture with consideration for any nonlinear behavior of the constituents.

The above-mentioned and other features and objects of this invention will become more apparent by reference to the following description taken in conjunction with the accompanying drawings, in which:

Fig. 1 is a perspective illustration of one embodiment of a device to obtain an integrated product coefficient of a pair of wavelength functions integrated over a predetermined wavelength interval;

Fig. 2 is a perspective schematic diagram of one embodiment of a nondispersive infrared spectrum analyzer for use in accordance with the principles of our invention;

Fig. 3 is a schematic illustration, partly in block form, of a nondispersive infrared spectrum analyzer in accordance with the principles of this invention; and Fig. 4 is a schematic diagram in block form of a nondispersive infrared continuous-process analyzer.

Referring to Fig. 1 of the drawings, apparatus for optically obtaining an integrated product coefficient is therein shown to comprise a source of infrared radiation 1 which emits infrared energy covering the wavelength interval of interest, for example, from 1 to 30 microns or from 2 to 15 microns. The infrared source irradiates two sample cells 2 and 3 disposed in tandem along the axis 4 of the system. The infrared energy in the beam emerging from the sample cell 3 falls upon an infrared detector 5. Assuming that the energy distribution of the infrared source 1 is uniform over the wavelength interval of interest, then the first sample cell 2 modifies the uniform spectrum output of the source 1 such that there is passed a spectrum output which reflects the character of its own infrared absorption spectrum. This modified infrared beam then passes through sample cell 3 where the infrared spectrum is further modified in percentage at every wavelength by the absorption spectrum of the sample contained in cell 3. Thus, the polychromatic infrared beam emerging from the two sample cells 2 and 3 is, in effect, the integrated product of the first and second percent transmission spectral functions. When this beam falls upon a detector 5 having a uniform response with respect to wavelength, such as a thermocouple, then the temperature rise and voltage output of the detector 5 are proportional to the integral of the product of the two wavelength functions. Thus, we are able to obtain a coefficient representing an integrated product of two spectra without the use of any prism, grating, filter or other monochromatic device.

It will be readily recognized to those skilled in the art of infrared analysis that the cofficients obtained in this manner are in terms of percent transmission rather than the logarithmic quantity of absorbance; and since mixture spectrograms are linearly additive only in terms of absorbance, as described by Beer's law, these cofficients cannot be used to describe the behavior of mixture spectrograms. Since it is not convenient to use an optical system which provides the transformation of percent transmission into the logarithmic units of absorbance, the coefficients obtained in this simple process cannot be used in a set of linear simultaneous equations which describe a mixture.

The nondispersive analyzer of our invention is dependent upon methods of linear analysis such as already described in copending application Serial No. 552,518, filed December 12, 1955, entitled "Electronic Spectroanalysis Computer," referred to above. If the disclosure contained in the referenced application is examined, it is seen that the analysis of a mixture spectrogram can be stated in terms of a set of product integrals which describe the behavior of the spectrum of the mixture as weighted assumed constituents and the product integrals obtained from combinations of the assumed constituents.

The objection to the use of precent transmission functions obtained by the equipment shown in Fig. 1 can be overcome by a simple expedient, and use of them can be made in a set of linear simultaneous equations to describe the mixture. It will be readily recognized that any nonlinear function, such as a logarithmic function, is substantially linear when considered over a small interval. Thus, if the integrated product coefficient is obtained from the system shown in Fig. 1 and if a second measurement is made by shifting the concentration of the chemical in the second cell by a small amount, then the difference between the two integrated coefficients so obtained will be linear with respect to this change in concentration. Thus, by "small" change in concentration is meant a change that will maintain the nonlinear transmission function substantially linear over the interval. Thus, the behavior of the absorption coefficient for small changes in concentration of one of the constituents in the second sample can be determined by two measurements. A set of such coefficients can be used to describe the behavior of a mixture spectrogram in terms of small changes of constituents of the mixture.

Referring again to the disclosure contained in copending application Serial No. 552,518 referenced above, it is seen therein that an initial quantitative analysis of a mixture spectrogram based upon a theory of linear addition of the constituent spectrograms can be obtained and a set of provisional concentration coefficients obtained to define the ratio of the quantities of the constituents contained in the mixture. This invention recognizes that this set of concentration coefficients may contain errors of a greater or lesser degree dependent upon the quantity of nonlinear combination in the mixture, the instrumental errors and the signal-to-noise ratio in the spectrogram. The apparatus in this invention is concerned with completing the analysis where extreme accuracy of quantitative data is required in spite of severe nonlinear behavior of the chemical constituents in the mixture. To complete the analysis and to eliminate any inaccuracies, it is necessary to convert the concentration coefficients obtained from the linear analysis, previously referred to, into a set of chemicals corresponding to the coefficients, thus creating a synthetic sample. Obviously, if the initial analysis is accurate in each detail and there are no errors due to nonlinear combination or other causes, the synethtic sample will be identical with the unknown composition or mixture in every detail. However, as is more likely, the synthetic sample will differ from the unknown sample due to the causes above mentioned.

In addition to the creation of the synthetic sample mentioned above, nondispersive analysis in accordance with the principles of our invention is accomplished by the ability to observe the effects of small differences in concentration of the constituents of a composition; and thus, a specific set of chemical-sample cells must be prepared. This set of sample cells is based upon the initial quantitative analysis and consists of, in addition to the synthetic sample of the mixture specimen, a first set of sample specimens each one differing from the next by a small shift in the concentration of one of the constituents and a second set of the chemical constituents each available in its own sample cell.

Referring to Fig. 2 of the drawings, one embodiment in schematic form of a nondispersive infrared spectrum analyzer in accordance with the principles of our invention is shown to comprise a source of infrared radiation 20. Our invention does not restrict the source of infrared energy to a uniform energy versus wavelength behavior; but any of the usual and practical infrared sources may be utilized. A plurality of sample cells 21-28 is disposed in such a manner that any one sample cell 21-28 can be moved into the optical axis 29 of the apparatus. A second set of sample cells 30-35 is also disposed to move into the optical axis 29 in tandem with any one of the sample cells 21-28. An infrared detector 36, such as a thermocouple, is located to detect the infrared energy transmitted through the pair of sample cells located on the optical axis. As previously explained in connection with the description of Fig. 1, the infrared energy detected by the detector 36 is the product of a first and second percent transmission spectral functions resultant from the sample cells disposed along the optcal axis. In accordance with the requirements of the apparatus of this invention, the unknown mixture is contained in sample cell 28; and the synthetic mixture determined by the linear analysis previously performed is contained in sample cell 27. Sample cells 21-26 contain the synthetic mixture modified by a small shift in the concentration in each of the constituents. The second set of cells 30-35 each contain one of the constituents going into the composite-mixture spectrum contained in sample cell 28.

In order to perform the nondispersive analysis in accordance with the principles of our invention, the unknown mixture 28 is moved onto the optical axis 29 and is masked in turn by each of its constituents determined by the initial quantitative analysis such constituents being contained in the cells of unit concentrations 30-35. The set of integrated absorption coefficients obtained from the output of the detector 36 due to each successive masking of the unknown mixture 28 are tabulated. Next, the synthetic-mixture specimen in sample cell 27 is moved onto the optical axis 29 and, as before, is successively masked by each of the constituents contained in cells 30-35 to obtain a second set of integrated absorption coefficients which are tabulated. Each of the synthetic samples 21-26 having a shift in one of the constituents is moved onto the optical axis 29 in turn and successively masked by each of the cells 30-35 to obtain further sets of integrated absorption coefficients from each of the shifted sample cells.

The tabulated measurements are utilized as a set of coefficients in a system of simultaneous equations in accordance with the following equation:

$$U_n - S_n = \Sigma(S_n - S_n^m)\Delta c_m$$

where:

$U_n$ = coefficient obtained from unknown sample masked by chemical constituent number $n$;

$S_n$ = coefficient obtained from synthetic sample masked by chemical constituent number $n$;

$S_n^m$ = synthetic sample, whose $m$th constituent has been increased by $\delta c_m$, masked by chemical constituent number $n$;

$\Delta c_m$ = desired difference in concentration between constituents in unknown versus synthetic (after normalizing in terms of $\delta c_m$).

Thus, for a composition having six unknowns, the following set of simultaneous linear equations is derived:

$$U_1 - S_1 = (S_1 - S_1^1)\Delta c_1 + (S_1 - S_1^2)\Delta c_2 + (S_1 - S_1^3)\Delta c_3 \quad (1)$$
$$+ (S_1 - S_1^4)\Delta c_4 + (S_1 - S_1^5)\Delta c_5 + (S_1 - S_1^6)\Delta c_6$$

$$U_2 - S_2 = (S_2 - S_2^1)\Delta c_1 + (S_2 - S_2^2)\Delta c_2 + (S_2 - S_2^3)\Delta c_3 \quad (2)$$
$$+ S_2 - S_2^4)\Delta c_4 + (S_2 - S_2^5)\Delta c_5 + (S_2 - S_2^6)\Delta c_6$$

$$U_3 - S_3 = (S_3 - S_3^1)\Delta c_1 + (S_3 - S_3^2)\Delta c_2 + (S_3 - S_3^3)\Delta c_3 \quad (3)$$
$$+ (S_3 - S_3^4)\Delta c_4 + (S_3 - S_3^5)\Delta c_5 + (S_3 - S_3^6)\Delta c_6$$

$$U_4 - S_4 = (S_4 - S_4^1)\Delta c_1 + (S_4 - S_4^2)\Delta c_2 + (S_4 - S_4^3)\Delta c_3 \quad (4)$$
$$+ (S_4 - S_4^4)\Delta c_4 + (S_4 - S_4^5)\Delta c_5 + (S_4 - S_4^6)\Delta c_6$$

$$U_5 - S_5 = (S_5 - S_5^1)\Delta c_1 + (S_5 - S_5^2)\Delta c_2 + (S_5 - S_5^3)\Delta c_3 \quad (5)$$
$$+ (S_5 - S_5^4)\Delta c_4 + (S_5 - S_5^5)\Delta c_5 + (S_5 - S_5^6)\Delta c_6$$

$$U_6 - S_6 = (S_6 - S_6^1)\Delta c_1 + (S_6 - S_6^2)\Delta c_2 + (S_6 - S_6^3)\Delta c_3 \quad (6)$$
$$+ (S_6 - S_6^4)\Delta c_4 + (S_6 - S_6^5)\Delta c_5 + (S_6 - S_6^6)\Delta c_6$$

The unknowns in the set of simultaneous linear equations can obviously be obtained by solving the set of linear equations and, when obtained, constitute a set of correction terms which, when applied to the coefficients determined from the original quantitative analysis, yields corrected concentration coefficients for each of the constituents which, when taken together, form an accurate statement of the composition of the mixture.

An important property of this method of analysis is that it is accomplished in terms of actual chemical mixture. Therefore, any nonlinear behavior of the constituent in the mixture field cannot produce error in the results. The procedure actually calibrates the chemical system, regardless of any nonlinear behavior; and the solutions obtained take into account this nonlinear behavior. Similarly, any errors in an initial analysis due to instrumental causes are similarly absorbed since the correction terms applied to the original analysis compensate for the initial inaccuracy.

The optics for use with spectral analysis equipment in accordance with the principles of this invention are obviously quite simple. Elimination of a dispersive component, such as a prism or a grating, constitutes an enormous simplification of the apparatus. Since no dispersion is required, no scanning of a dispersed spectrum is needed. Therefore, the mechanical construction of the device is also reduced to a simple form.

Referring to Fig. 3 of the drawings, a schematic diagram, partly in block form, of one embodiment of a nondispersive infrared spectrum analyzer is shown therein to perform the analysis described above in a minimum amount of time by making a plurality of measurements simultaneously. In order to keep the procedure time to a minimum, a plurality of measurements must be made simultaneously. An infrared source 41 is surrounded by a pair of turrets 42 and 43. Turret 42 is movable and contains the cells having samples of the individual constituents $f_1$-$f_6$ and corresponds to sample cells 30–35 shown in Fig. 2. The second or outer turret 43 is fixed and contains the synthetic samples, each having a shift in one constituent, and the synthetic-mixture sample and the sample of the unknown mixture, corresponding to the cells 21–28 of Fig. 2. In order to perform the plurality of measurements simultaneously, infrared detectors 44–51 are utilized which, in order to give substantially identical results, are each given an initial balance adjustment which can be maintained over the relatively short time necessary for a complete analysis. Since the infrared source 41 is shared by all optical paths, no compensation for any difference in the spectral content of the source is necessary. When the turrets 42 and 43 are in the position shown, it is obvious that six measurements needed for the set of simultaneous equations are made simultaneously.

Obviously, the time needed to obtain the integrated absorption coefficients for each position of the turret 42 is influenced by the desired signal-to-noise ratio; and since the entire spectrum is available at the detector without scanning, the amount of energy measured by the detector is far greater than if a monochromatic device was utilized between the source and the detector.

It should be apparent to one skilled in the art that the nondispersive infrared analyzer shown in Fig. 3, wherein a plurality of measurements is simultaneously accomplished, can be utilized with both a single radiation source and a single radiation detector. The only modification necessary to the embodiment shown in Fig. 3 to utilize a single infrared detector is the mounting of the detector on a turret concentric with the turrets holding the specimen cells. Thus, the various measurements can be accomplished by utilizing a single radiation source and time sharing a single detector.

The system of our invention is particularly advantageous where the constituents and concentrations of the unknown composition vary in small amounts only. In such a situation, the composition of the synthetic-sample cells contained in the outer turret need not be changed; and continuous solution of the simultaneous equations permits continuous quantitative analysis of the unknown with a high order of accuracy in a negligible amount of time.

Another principle application of the analyzer of our invention is found where extreme accuracy of the quantitative data is required, in spite of severe nonlinear behavior of the chemical constituents contained in the mixture and in spite of relatively high order of instrumental inaccuracy, since the use of the chemical cells in the spectrophotometer completely compensates for this nonlinear behavior thus assuring that accurate analyses are always available.

One of the foremost uses for infrared spectrometers is as sensing means for control apparatus in a continuous chemical process. Nondispersive electronic spectroanalysis equipment in accordance with the principles of this invention for use in the control of a continuous process is illustrated in Fig. 4 of the drawings. The control of a continuous process is accomplished in two steps, the first step comprising that of calibration and the second step comprising continuous monitoring control. The calibration can be accomplished prior to the start of the process and may be accomplished independently of the continuing process.

Referring to Fig. 4 of the drawings, a continuous processing means is illustrated schematically by block 52. The processing means 52 accepts the constituent inputs $f_1$, $f_2$ and $f_3$ in quantities determined by the valves 53, 54 and 55 and operates upon them to produce a desired output from outlet 56. When something occurs to cause the ratio of the constitutents $f_1$, $f_2$ and $f_3$ in the output to differ from a desired predetermined ratio, corrective steps must be taken. By continuously analyzing the output of the processing means 52, the erroneous ratio can be quickly detected and instructions fed back to the valves 53–55 and to the processing means 52 to correct the proportions of the input constitutents. In order to continuously analyze the output of the processing means, a portion of the output is passed through a pump 57 to absorption cells 58, 59 and 60. A source 61 of infrared radiation causes energy to be transmitted through the absorption cells 58–60 and through masks or sample cells 62, 63 and 64. Each of the sample cells 62–64 contains a unit concentration of one of the input constituents $f_1$, $f_2$ and $f_3$. The incident radiation from the infrared source 61 modified by the absorption characteristics of the output of the process contained in cells 58–60 modified by the unit concentrations in cells 62–64 is determined in detectors 65, 66 and 67 whose outputs are passed to a known type of computer 68. Such a computer can be of the type mentioned in the "Journal of Applied Physics," page 339, volume 19, April 1948. A plurality of coefficients determined from the step of calibration, as hereinafter explained, are coupled to subtractor circuits 69–77 whose outputs form the other inputs to the computer 68. The outputs of the computer 68 comprise an error voltage for each of the constituents which is coupled through a servo system 78 back to the valves 53–55 to correct the input quantity of each of the constituents to maintain the output product of processing means 52 identical to the predetermined desired product in quantity and content of the constituents.

The precalibration necessary to determine the calibration coefficients to be coupled to the subtraction circuits, whose differences are coupled to the computer or preset therein, is accomplished by the use of the equipment shown in Fig. 2 or Fig. 3. A sample of the desired product is prepared along with a plurality of samples, each one having a known unit change in one of the constituents and thus differing from the sample of the desired product and from each other. In addition, sample cells of each of the constituents are also necessary. The calibration measurements to obtain the calibration coefficients are accomplished by masking the desired-product cell and each of the desired-product cells having a small change in one of the constituent elements by each of the constituent sample cells and detecting the radiation transmitted through the combination. Thus, for example, in a process having only three constituents, $f_1$, $f_2$ and $f_3$, the calibration measurements yield the following calibration coefficients wihch are coupled as inputs to the subtraction circuits 69–77:

$$x_1(S) \quad\quad x_2(S) \quad\quad x_3(S)$$
$$x_1(S+u_1) \quad x_2(S+u_1) \quad x_3(S+u_1)$$
$$x_1(S+u_2) \quad x_2(S+u_2) \quad x_3(S+u_2)$$
$$x_1(S+u_3) \quad x_2(S+u_3) \quad x_3(S+u_3)$$

where S is the desired-product output of the processing means;

$S+u_n$ is the desired-product output with a unit change in constituent $f_n$;

$x_n(S)$ is the coefficient obtained when the cell S is masked by the sample cell of constituent $f_n$ and is indicative that the coefficient $x_n(S)$ is a function of S; and $x_n(S+u_n)$ is the coefficient obtained when the cell having a unit change in constituent $f_n$ is masked by the sample cell of the constituent $f_n$ and is indicative that the coefficent $x_n(S+u_n)$ is a function of $(S+u_n)$.

It is apparent from the previous discussion that $x_n(S+u_n) - x_n(S)$ is related to the change in unit concentration of constituent $f_n$; and so, from the calibration coefficients, difference coefficients are obtained in accordance with the following table:

$$x_1(S+u_1)-x_1(S) \quad x_1(S+u_2)-x_1(S) \quad x_1(S+u_3)-x_1(S)$$
$$x_2(S+u_1)-x_2(S) \quad x_2(S+u_2)-x_2(S) \quad x_2(S+u_3)-x_2(S)$$
$$x_3(S+u_1)-x_3(S) \quad x_3(S+u_2)-x_3(S) \quad x_3(S+u_3)-x_3(S)$$

and it is these difference coefficients obtained from the outputs of the subtraction circuits 69–77 which are coupled into the computer 68 of Fig. 4. It is apparent that these coefficients need be obtained only once for each process having a desired end product and can be preset into the computer 68 to be utilized therein in accordance with the following analysis. The apparatus shown in Fig. 4 simultaneously yields coefficients which are functions of the actual output $u$ of the processing means masked by each of the constituents $f_n$, and these coefficients may be termed $x'_n$. Thus, the following set of equations is derived:

$$x'_1-x_1(S)=\gamma_1[x_1(S+u_1)-x_1(S)]+$$
$$\gamma_2[x_1(S+u_2)-x_1(S)]+\gamma_3[x_1(S+u_3)-x_1(S)]$$

$$x'_2-x_2(S)=\gamma_1[x_2(S+u_1)-x_2(S)]+$$
$$\gamma_2[x_2(S+u_2)-x_2(S)]+\gamma_3[x_2(S+u_3)-x_2(S)]$$

$$x'_3-x_3(S)=\gamma_1[x_3(S+u_1)-x_3(S)]+$$
$$\gamma_2[x_3(S+u_2)-x_3(S)]+\gamma_3[x_3(S+u_3)-x_3(S)]$$

where $\gamma_n$ are the error coefficients by which the output of the process varies in constituent $f_n$ from the desired quantity contained in the desired end product. It is apparent that the linear equations above defined can be easily solved, by any one of many known computers, for the quantities $\gamma_n$ which are the only unknowns and that these $\gamma_n$ can be coupled to the servo system 78 whose output can be utilized by valves 53–55 to adjust the quantity of the input of each of the constituents in the process carried out in means 52.

While we have described above the principles of our invention in connection with specific apparatus, it is to be clearly understood that this description is made only by way of example and not as a limitation to the scope of our invention as set forth in the objects thereof and in the accompanying claims.

We claim:

1. The method of characterizing, from the radiation-transmission characteristics, the radiation-absorbance characteristics of a mixture having a plurality of identified constitutents in unknown quantities comprising the steps of measuring the radiation transmitted through a sample of said mixture and each of said constituents, measuring the energy transmitted through a first synthetic sample in which said constituents are present in a given ratio in tandem with each of said constituents, measuring the energy transmitted through a second synthetic sample having a small change in the concentration of at least one of its constituents relative to said first synthetic sample in tandem with each of said constituents, and obtaining the difference between said measurements whereby said difference is linearly related to the change in concentration between said first and second synthetic samples and thus is related to the absorbance characteristic of the mixture due to the changed constituent.

2. The method of characterizing, from the infrared-transmission characteristics, the infrared-absorbance characteristics of a mixture having a plurality of identified constituents in unknown quantities comprising the steps of measuring the infrared energy transmitted through a sample of said mixture and each of said identified constituents, measuring the infrared energy transmitted through a first synthetic sample in which said constituents are present in a given ratio in tandem with each of said identified constituents, making a plurality of measurements of the infrared energy transmitted through each of a plurality of second synthetic-sample cells each containing at least all of said identified constituents and each having a small change in the concentration of at least a different one of the identified constituents relative to said first synthetic sample in tandem with each of said identified constituents, and obtaining the difference between said measurements whereby said difference is linearly related to the change in concentration between said first and second synthetic samples and thus is related to the absorbance characteristic of the mixture due to the changed constituent.

3. The method of characterizing, from the infrared-transmission characteristics, the infrared-absorbance characteristics of a mixture having a plurality of known constituents in an unknown ratio comprising the steps of analyzing said unknown mixture to determine approximately the ratio of the constituents in terms of assumed linear behavior of the constituents, synthesizing a sample mixture in accordance with the results of said analysis, determining a first set of coefficients indicative of the absorbance characteristics of said unknown mixture masked by each of said known constituents, determining a second set of coefficients indicative of the absorbance characteristics of said synthetic sample masked by each of said known constituents, determining a plurality of third sets of coefficients each indicative of the absorbance characteristics of one of a sample having a small change in the ratio of one of the constituents relative to said synthesized sample masked by each one of said known constituents, and obtaining the solution of a set of linear equations in which the differences between the coefficients obtained from the unknown mixture masked by one of said given constituents and the coefficients of the synthetic sample masked by one of said given constituents are set equal to the sum of the products of each of the differences between said synthetic sample masked by said given constituent and each of said second synthetic samples masked by said given constituent multiplied by a correction coefficient associated with each of the constituents whereby the addition of the associated correction coefficients to the approximate ratio yields the true ratio of the constituents in the unknown sample.

4. In a spectroanalyzer, a radiation source, a radiation detector, means for selectively disposing a plurality of mixtures having a given set of constituents in varying ratios between said source and said detector, and second means to dispose one of said constituents in tandem with said first means between said source and said detector.

5. In a spectrum analyzer, in combination, a radiation source, a radiation detector disposed in optical alignment with respect to said radiation, a plurality of first cells adapted to be selectively disposed between said source and said detector, each of said first cells containing substantially the same constituents in varying proportions, a plurality of second cells adapted to be selectively disposed in tandem with said first cells, each of said second cells containing substantially one of said constituents, and means to detect the radiation transmitted through each of said first cells when in tandem relation with each of said second cells.

6. A device for analyzing a multicomponent mixture comprising in optical alignment a source of infrared radiation, a plurality of detectors, means adapted to receive radiation from said source along a plurality of optical axes, a plurality of gas-analyzing chambers each disposed between said source and one of said plurality of detectors, means interconnecting said chambers permitting said mixture to flow through said chambers, and means for interposing between said source and said detectors a cell containing one of the constituents of said mixture in each of said optical axes.

7. The method of determining, from the infrared-transmission characteristics, the deviation from a standard of the ratio of the constituents in a given composition comprising the steps of obtaining a first set of calibration coefficients representing the absorbance characteristic of infrared radiation transmitted through said standard and each of said constituents, obtaining a second set of calibration coefficients representing the absorbance characteristic of infrared radiation transmitted through a composition having a small change in the ratio of one of the constituents relative to said standard and each of said constituents, obtaining a set of measured coefficients representing the absorbance characteristic of infrared radiation transmitted through said given composition and each of said constituents, and obtaining a set of error coefficients each associated with one of said constituents and representing the difference in the ratio for said one of the constituents between said given composition from a set of simultaneous linear equations in which the difference of the measured coefficients and one of said first calibration coefficients each associated with the same constituent is set equal to the sum of the products of one of said first calibration coefficients substracted from one of said second coefficients both associated with the same constituent and one of said error coefficients.

8. Apparatus for the continuous processing of a plurality of constituents into a given composition comprising a source for each of said constituents, means associated with each of said sources to control the output therefrom, processing means coupled to the outputs of said sources, means to analyze the output of said processing means including a source of infrared radiation, a plurality of detectors, means adapted to receive radiation from said source along a plurality of optical axes, a plurality of gas-analyzing chambers each disposed between said source and one of said plurality of detectors, means interconnecting said chambers permitting said mixture to flow through said chambers, means for interposing between said source and said detectors a cell containing one of the constituents of said mixture in each of said optical axes, computing means, means to obtain from said computer a plurality of voltage outputs each associated with one of said plurality of constituents, each of said voltages being a function of the radiation detected by each of said detectors, and means for coupling each of said voltages back to said output control means associated with one of said sources.

References Cited in the file of this patent

UNITED STATES PATENTS

| | | |
|---|---|---|
| 2,720,594 | Hutchins | Oct. 11, 1955 |
| 2,741,703 | Munday | Apr. 10, 1956 |
| 2,761,067 | Troy | Aug. 28, 1956 |
| 2,806,144 | Berger et al. | Sept. 10, 1957 |